(12) United States Patent
Beck et al.

(10) Patent No.: US 8,530,005 B2
(45) Date of Patent: Sep. 10, 2013

(54) CONTROL OF NANOCRYSTALLINE CELLULOSE FILM IRIDESCENCE WAVELENGTH

(75) Inventors: Stephanie Beck, Montreal (CA); Jean Bouchard, Montreal (CA); Richard Berry, Notre-Dame-de-L'lle Perrot (CA)

(73) Assignee: Fpinnovations, Pointe-Claire, Quebec (CA)

( * ) Notice: Subject to any disclaimer, the term of this patent is extended or adjusted under 35 U.S.C. 154(b) by 673 days.

(21) Appl. No.: 12/768,891

(22) Filed: Apr. 28, 2010

(65) Prior Publication Data

US 2010/0279019 A1 Nov. 4, 2010

Related U.S. Application Data

(60) Provisional application No. 61/213,053, filed on May 1, 2009.

(51) Int. Cl.
*B01J 19/10* (2006.01)
*B05D 3/10* (2006.01)
*B05D 3/06* (2006.01)

(52) U.S. Cl.
USPC ........... 427/565; 427/600; 427/384; 427/180; 427/201; 204/157.62; 204/157.91

(58) Field of Classification Search
None
See application file for complete search history.

(56) References Cited

U.S. PATENT DOCUMENTS

| | | | |
|---|---|---|---|
| 2,558,066 A * | 6/1951 | Wedler | 536/101 |
| 3,278,519 A | 10/1966 | Battista et al. | |
| 3,718,722 A | 2/1973 | Lee | |
| 5,629,055 A | 5/1997 | Revol et al. | |
| 6,153,413 A | 11/2000 | Watanabe et al. | |
| 6,531,230 B1 * | 3/2003 | Weber et al. | 428/480 |
| 6,797,366 B2 | 9/2004 | Hanson et al. | |
| 6,987,590 B2 | 1/2006 | Phillips et al. | |
| 7,029,745 B2 | 4/2006 | Bonkowski et al. | |
| 7,386,212 B2 * | 6/2008 | Ouderkirk et al. | 385/127 |
| 8,398,901 B2 * | 3/2013 | Beck et al. | 264/1.34 |
| 2005/0084699 A1 | 4/2005 | Depres | |
| 2008/0107829 A1 | 5/2008 | Oya et al. | |
| 2010/0148118 A1 * | 6/2010 | Beck et al. | 252/182.12 |

(Continued)

FOREIGN PATENT DOCUMENTS

| | | | | |
|---|---|---|---|---|
| CA | 2685145 | | 5/2010 | |
| JP | 58-206601 A | * | 12/1983 | 204/157.15 |

OTHER PUBLICATIONS

Pan et al. *Macrolmol.*, 2010, (43(8), 3851-3858, published Apr. 2, 2010, (on web).

(Continued)

*Primary Examiner* — Marianne L. Padgett
(74) *Attorney, Agent, or Firm* — Norton Rose Fulbright Canada LLP

(57) ABSTRACT

A new method to control the iridescence color of solid nanocrystalline cellulose (NCC) films by ultrasound and high-shear (mechanical) energy input to the NCC suspension prior to film formation is provided. As the energy input to the NCC suspension increases, the resulting film color shifts from the ultraviolet region towards the infrared region of the electromagnetic spectrum; this wavelength shift lies in the opposite direction to that caused by the addition of electrolytes to NCC suspensions prior to film formation. No additives are required to achieve the changes in color; color changes can also be effected by mixing two suspensions exposed to different levels of sonication.

22 Claims, 14 Drawing Sheets

(56) References Cited

U.S. PATENT DOCUMENTS

| | | | |
|---|---|---|---|
| 2010/0151159 A1* | 6/2010 | Beck et al. | 428/30 |
| 2011/0183141 A1* | 7/2011 | Beck et al. | 428/402 |
| 2011/0248214 A1* | 10/2011 | MacLachlan et al. | 252/299.01 |
| 2011/0290149 A1* | 12/2011 | Beck et al. | 106/163.01 |
| 2012/0237750 A1* | 9/2012 | Zou et al. | 428/221 |

OTHER PUBLICATIONS

Simon et al., *NSTI Nanotech conference and trade show, Tech proceed*, Boston, Mass, USA, Jun. 1-5, 2008, vol. 1, 840-843, ISBN: 978-1-4200-8507.5.

French, A.D.; Bertonière, N.R.; Battista, O.A.; Cuculo, J.A.; Gray, D.G., "Cellulose", in *Kirk-Othmer Encyclopedia of Chemical Technology*, 4$^{th}$ ed. New York: John Wiley & Sons, 1993, vol. 5.

Sarko, A.; Marchessault, R.H. *J. Polym. Sci., Part C: Polym. Symp.* 1969, 28, 317-331.

Mark, H. *J. Phys. Chem.* 1940, 44, 764-787.

Earl, W.L.; VanderHart, D.L. *Macromolecules* May-Jun. 1981, 14, 570-574.

Fink, H.P.; Philipp, B.; Paul, D.; Serimaa, R.; Paakkari, T. *Polymer* Jul. 1987, 28, 1265-1270.

Battista, O.A.; Coppick, S.; Howsmon, J.A.; Morehead, F.F.; Sisson, W.A. *Ind. Eng. Chem.* 1956, 48, 333-335.

Marchessault, R.H.; Morehead, F.F.; Koch, M.J. *J. Colloid Sci.* 1961, 16, 327-344.

Grunert, M.; Winter, W.T. *J. Polym. Environ.* Apr. 2002, 10, 27-30.

Favier, V.; Chanzy, H.; Cavaillé, J.Y. *Macromolecules* 1995, 28, 6365-6367.

Rånby, B.G. *Discuss. Faraday Soc.* 1951, 11, 158-164.

Marchessault, R.H.; Morehead, F.F.; Walter, N.M. *Nature* Aug. 22, 1959, 184, 632-633.

Revol, J.-F.; Bradford, H.; Giasson, J.; Marchessault, R.H.; Gray, D.G. *Int. J. Biol. Macromol.* 1992, 14, 170-172.

Dong, X.M.; Kimura, T.; Revol, J.-F.; Gray, D.G. *Langmuir* 1996, 12, 2076-2082.

Dong, X.M.; Revol, J.-F.; Gray, D.G. *Cellulose* 1998, 5, 19-32.

Araki, J.; Wada, M.; Kuga, S.; Okano, T. *Colloids Surf., A* 1998, 142, 75-82.

Onsager, L. *Ann. N.Y. Acad. Sci.* 1949, 51, 627-659.

Hermans, J. *J. Polym. Sci., Part C: Polym. Symp.* 1963, 2, 129-144.

Beck, S.C. *Phase Separation Phenomena in Cellulose Nanocrystal Suspensions Containing Dextran-Dye Derivatives.* Ph.D. Thesis, McGill University: Montréal, 2007.

de Gennes, P.G. *The Physics of Liquid Crystals.* Oxford: Clarendon Press, 1974, The International Series of monographs on physics, editors Marshall et al.

Revol, J.-F.; Godbout, L.; Gray, D.G. *J. Pulp Pap. Sci.* 1998, 24, 146-149.

de Vries, Hl. *Acta. Cryst.* 1951, 4, 219-226.

Roman, M.; Gray, D.G. *Langmuir* 2005, 21, 5555-5561, published on Web Apr. 29, 2005.

Edgar, C.D.; Gray, D.G. *Cellulose* 2001, 8, 5-12.

Bondeson, D.; Mathew, A.; Oksman, K. Cellulose 2006, 13, 171-180.

Nishiyama, Y.; Kuga, S.; Wada, M.; Okano, T. *Macromolecules* 1997, 30, 6395-6397.

Cranston, E.D.; Gray, D.G. *Biomacromolecules* 2006, 7, 2522-2530, published on Web Aug. 18, 2006.

Wågberg, L.; Decher, G.; Norgren, M.; Lindström, T.; Ankerfors, M.; Axnäs, K. *Langmuir* 2008, 24, 784-795, published on Web Jan. 11, 2008.

Revol, J.-F.; Marchessault, R.H. *Int. J. Biol. Macromol.* Dec. 1993, 15, 329-335.

Dong, X.M.; Gray, D.G. *Langmuir* 1997, 13, 2404-2409.

* cited by examiner

CONTROL OF NANOCRYSTALLINE CELLULOSE FILM IRIDESCENCE WAVELENGTH

CROSS-REFERENCE TO RELATED APPLICATION

This application is related to U.S. Provisional Application 61/213,053 filed May 1, 2009 and the benefit under 35 USC 119(e) of such US Provisional Application is claimed.

BACKGROUND OF THE INVENTION

1. Field of the Invention

This invention relates to the control of the unique iridescence properties of solid films of nanocrystalline cellulose (NCC) particles prepared by sulfuric acid hydrolysis of cellulose, in particular to the control of the iridescence wavelength by means of mechanical energy input such as ultrasound or high-shear forces to the aqueous NCC suspension prior to film formation by evaporation.

2. Description of the Prior Art

Cellulose is the most abundant organic compound on earth. It is the structural component of the primary cell wall of higher plants and green algae, and it is also formed by bacteria, some fungi, and tunicates (invertebrate marine animals) [1].

Native cellulose has a hierarchical structure, from the polymeric glucose chains to the microfibrils which make up the cell walls of plants. The cellulose polymer chain is derived from D-glucose units, which condense through $\beta(1\rightarrow4)$-glycosidic bonds giving a rigid straight chain having many inter- and intramolecular hydrogen bonds among the many glucosidic hydroxyl groups. These features allow the cellulose chains to pack closely to give areas of high crystallinity within the microfibril [2]. Cellulose microfibrils also contain amorphous regions randomly distributed along their length [3-5].

Cellulose whiskers or nanocrystals are obtainable by controlled acid hydrolysis of cellulose from various sources, in particular from wood pulp and cotton. The less-dense amorphous regions along the cellulose microfibril are more susceptible to acid attack during hydrolysis and cleave to give cellulose nanocrystals [6,7]. Their low cost, renewability and recyclability, and their chemical reactivity allowing their chemical and physical properties to be tailored make nanocrystalline cellulose whiskers attractive for various applications [8,9].

Nanocrystalline cellulose (NCC) is rodlike in shape with an aspect ratio which varies from 1 to 100 depending on the cellulose source. Wood cellulose nanocrystals average 180-200 nm in length with a cross section of 3-5 nm [9]. Nanocrystal dimensions also depend to a certain extent on the hydrolysis conditions used to obtain them.

The stability of NCC suspensions derives from sulfate ester groups imparted to the cellulose nanocrystal surfaces during hydrolysis with sulfuric acid. The NCC particles are therefore negatively charged in aqueous media and are thus electrostatically stabilized [7,10-14]. Hydrochloric acid has also been used to produce NCC, but does not introduce charged surface groups [15].

The anisometric rod-like shape and negative surface charge of NCC particles result in suspensions which phase separate into an upper random phase and a lower ordered phase, at concentrations above a critical concentration, as described theoretically by Onsager [16]. The ordered phase is in fact a liquid crystal; liquid crystalline behaviour of cellulose suspensions was first reported by Rånby in 1951 [10]. Marchessault et al. and Hermans demonstrated that such suspensions displayed nematic liquid crystalline order [11,17]. In 1992, Revol and co-workers showed that the suspensions in fact formed a cholesteric, or chiral nematic, liquid crystalline phase [12].

As shown in FIG. 1, chiral nematic liquid crystals contain rods arranged in pseudo-layers [18,19]. The rods are aligned parallel to each other and to the plane of the layer, each layer being rotated slightly with respect to the layers above and below it, thereby producing a helix composed of the pseudo-layers. The pitch P of the helix is defined as the distance required for the NCC particles to make one full rotation about a line perpendicular to the layers. Between two critical concentrations, an NCC suspension will separate into two phases [16]. This region spans a range of approximately 3-8% (w/w) for cellulose nanocrystals. As the NCC concentration increases, the volume fraction of liquid crystalline phase increases until the suspension becomes completely chiral nematic above the upper critical concentration.

Aqueous NCC suspensions can be slowly evaporated to produce solid semi-translucent NCC films that retain the chiral nematic liquid crystalline order which forms above the critical concentration and increases in volume fraction as the water continues to evaporate. These films exhibit iridescence by reflecting left-handed circularly polarized light in a narrow wavelength band determined by the chiral nematic pitch and the refractive index of the film (1.55) according to Equation 1:

$$\lambda = nP \sin \theta,$$

where $\lambda$ is the reflected wavelength, n is the refractive index, P is the chiral nematic pitch, and $\theta$ is the angle of reflection relative to the surface of the film [20]. The wavelength reflected thus becomes shorter at oblique viewing angles. This reflectance was explained by de Vries [21] on the basis of Bragg reflections in a helicoidal arrangement of birefringent layers, as is the case for cellulose nanocrystals in a chiral nematic liquid crystal. When the pitch of the helix is on the order of the wavelengths of visible light (around 400 to 700 nm), the iridescence will be coloured and will change with the angle of reflection. It has been found that the iridescence wavelength can be shifted toward the ultraviolet region of the electromagnetic spectrum by increasing the electrolyte concentration (e.g., NaCl or KCl) in the NCC suspension prior to film formation [20]. The additional electrolyte partially screens the negative charges of the sulfate ester groups on the NCC surfaces, reducing the electrostatic repulsion. The rodlike particles therefore approach each other more closely, which reduces the chiral nematic pitch of the liquid crystal phase and shifts the iridescence to shorter wavelengths. This method of "blue-shifting" NCC film iridescence is limited by the amount of salt which can be added before the colloidal suspension is destabilized by too much screening and gelation occurs [13,20].

The NCC film iridescence colours observed by Revol et al. also depended on the cellulose source and the hydrolysis conditions (e.g., reaction time and ground cellulose particle size) [20]. Smaller NCC particles yield films with a smaller pitch. Desulfation was also found to reduce the chiral nematic pitch [20].

The microstructure of solid NCC films depends on the drying conditions [22]. Suspensions evaporated at ambient conditions generally produce films with polydomain structures in which the helical axes of different chiral nematic domains point in different directions. Drying NCC suspensions in a strong (2 T) magnetic field will align the axes to produce a more uniform texture, increasing the intensity of the iridescence without changing the wavelength [20,23].

In the laboratory-scale procedure for producing NCC, sonication is used as a final step following acid removal by dialysis, in order to disperse the particles to obtain a colloidal suspension [13,23]. The effects of sonication on NCC suspension properties have been studied by Dong et al. [14]. They found that brief sonication was sufficient to disperse the cellulose particles and further sonication was counterproductive. A more recent study corroborates this observation [24]. Sonication is thought to break up side-by-side NCC aggregates in suspension [7].

Because particles with larger aspect ratios have smaller critical concentrations for liquid crystal phase formation, increasing sonication has been found to decrease the volume fraction of chiral nematic phase in NCC suspensions of equal concentration. Interestingly, however, sonication continues to affect the critical concentration beyond the point where the NCC particle size is affected [14]. FIG. 2 shows the effect of sonication on mean NCC particle size measured by PCS, for a 15-mL samples of 1.5% (w/w) re-dispersed freeze-dried sodium-form NCC in 10 mM NaCl, sonicated at 60% output (8 watts) in 4-s pulses with 4-s intervals between. In FIG. 2, it can be seen that the apparent NCC particle size no longer diminishes above 200 J energy input from sonication.

Films of NCC with high uniaxial orientation have also been produced by spinning NCC suspensions derived from the cell wall of a green alga in a rotating horizontal cylinder to produce a gel layer which is subsequently dried [25], but they do not display iridescence. Films of NCC have also been prepared on substrates such as silicon [26]. These films are much thinner than the solid NCC films and are composed of alternating layers of NCC and a cationic polymer (poly(allylamine hydrochloride)). Above a certain thickness, the films exhibit colours that change with increasing thickness, but these colours are due to destructive interference between light reflected from the air-film interface and from the film-substrate interface [26]. Interference colours have also been seen in polyelectrolyte multilayers of microfibrillated cellulose [27]. In addition, films of closely related chitin crystallites retaining the chiral nematic order present in aqueous suspensions above a critical concentration have been produced [28].

There is no known method to shift the iridescence wavelength of solid NCC films that contain no additives. In addition, there has been no method to shift the iridescence wavelength of solid NCC films in the direction of the red end of the visible electromagnetic spectrum.

SUMMARY OF THE INVENTION

It is an object of this invention to provide a method for controlling wavelength of iridescence in a solid nanocrystalline cellulose film.

It is a further object of this invention to produce solid nanocrystalline cellulose films having a predetermined iridescence wavelength range.

In one aspect of the invention, there is provided a method of controlling wavelength of iridescence in a solid nanocrystalline cellulose film comprising: subjecting an aqueous suspension of NCC to a predetermined mechanical energy input to achieve a desired or predetermined wavelength of iridescence, and thereafter allowing water in the suspension to evaporate to form a film.

In another aspect of the invention, there is provided a method of producing a solid nanocrystalline cellulose film of predetermined iridescence comprising: subjecting an aqueous suspension of NCC to a predetermined mechanical energy input correlated to a desired predetermined iridescence, and thereafter, allowing water in the suspension to evaporate with formation of a solid film having said desired predetermined iridescence wavelength range.

The invention also relates to a solid nanocrystalline cellulose film of predetermined iridescence wavelength range.

Solid nanocrystalline cellulose films have utility resulting from their iridescence, thus they may be employed in security or anti-counterfeiting papers; they may also be employed in decorative papers.

Images may be formed in the papers exploiting their iridescent properties, which are difficult to copy.

DETAILED DESCRIPTION OF THE INVENTION WITH REFERENCE TO THE DRAWINGS

Figure 1:
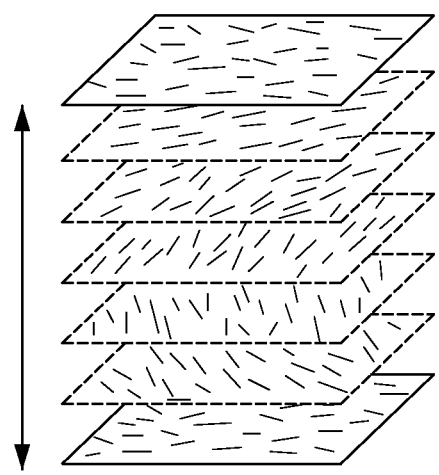
FIG. 1 is a schematic view of the arrangement of NCC particles in the chiral nematic phase. Distance indicated is half the chiral nematic pitch P.
Figure 2:
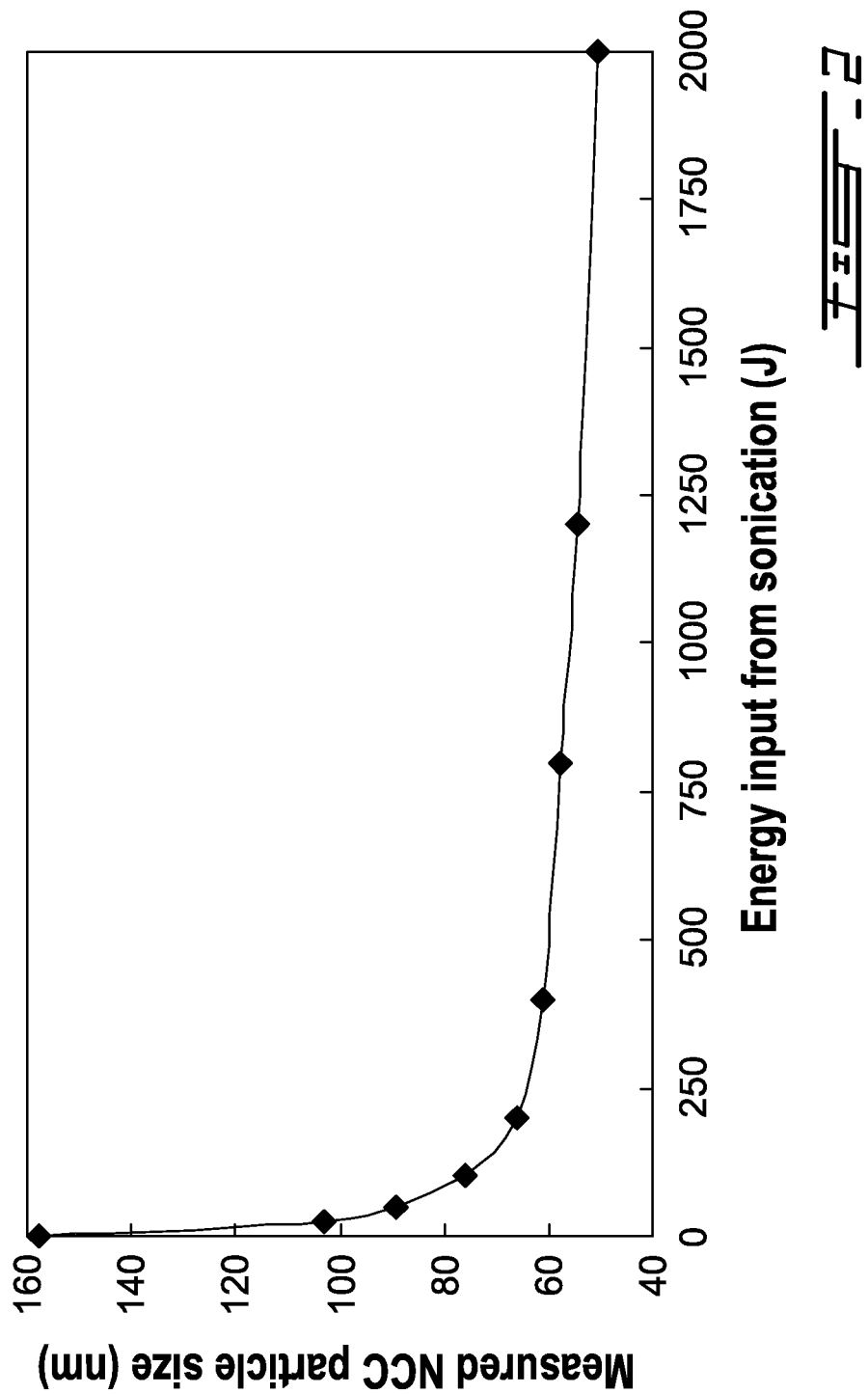
FIG. 2 shows the effect of sonication on mean NCC particle size measured by PCS.

Sonication of acid-hydrolyzed cellulose to produce colloidal-sized cellulose nanocrystals is a necessary step in the laboratory-scale production of NCC suspensions. In the literature, a batch of hydrolyzed cellulose (~1-2 L at ~2% cellulose (w/w)) in a plastic container is placed in an ice bath and sonicated for periods of 5-7 minutes with cooling intervals in between to avoid overheating and consequent desulfation [14]. However, the energy imparted to the cellulose during the sonication stage has not been previously quantified, owing to the great variability in power from instrument to instrument and the strong dependence on sonication conditions.

Above a critical concentration. NCC suspensions phase separate into an upper random phase and a lower ordered phase with chiral nematic liquid crystalline texture. This texture is preserved when the suspensions are slowly dried, forming solid semi-translucent NCC films which reflect circularly polarized light in a narrow wavelength band. The iridescence in the IR, visible and UV regions of the spectrum can be fine-tuned by controlling the electrolyte (e.g., NaCl) concentration in the NCC suspension, which reduces the chiral nematic pitch and hence shifts the iridescence towards shorter wavelengths [20,29]. No method has been reported in the literature to control the iridescence wavelength without the use of additives, nor has a method been reported which shifts the iridescence towards longer wavelengths.

There is a strong need for a quality control procedure for NCC film and coating applications where controlled iridescence or specific colour reflection is an attribute. The wavelength shift caused by sonication is most likely caused by a decrease in chiral nematic pitch of the films, but the mechanism by which this occurs is poorly understood. The degree of sulfation of NCC is known to affect reflection colour of dried films [20], but has not been found to be affected by sonication [14]. In laboratory tests, the sulfur content of an H-NCC suspension (15 mL, 2.7% NCC (w/w)) sonicated to 1500 J (3700 J/g NCC energy input) and then dialyzed was found to be 0.85% S (w/w) by elemental analysis (ICP). This was identical to the sulfur content of the unsonicated suspension.

It has now been found that the iridescence wavelength of solid nanocrystalline cellulose films can be shifted towards the red (longer-wavelength) end of the electromagnetic spectrum by high-shear mechanical action, such as high pressure shear, or ultrasound treatment of the initial aqueous NCC suspension prior to drying by slow evaporation of the dispersant. The method is described more fully hereinafter by reference to the embodiment in which ultrasound treatment is employed, such treatment involves sonication at a given power of a given volume of NCC suspension to a given energy input followed by evaporation at temperatures ranging from ambient (20-25° C.) to just below boiling. The evaporation at such temperatures is without turbulence in the suspension or in a quiescent state.

Typically the evaporation is carried out on a thin liquid layer of the suspension on a substrate such as plastic (e.g., polystyrene or Teflon®) or glass from which the resulting film can be readily removed or peeled; as a self supporting film, or the film can be formed as a coating directly on a substrate, for example a glass or plastic sheet or plate on which an iridescent film surface is required, thereby providing a film-coated article as a product defined by the substrate and the film coating thereon.

The iridescence of the resulting NCC films increases in wavelength as the energy input due to sonication increases and as the sonication amplitude increases for a given energy input. The method of the invention produces a shift in the iridescence wavelength from a first wavelength to a second wavelength, wherein the second wavelength is longer than the first wavelength.

The conditions of sonication (quantity and concentration of suspension sonicated) also affect the iridescence wavelength. The key variable controlling the iridescence wavelength range of the final NCC film is the sonication energy input per gram NCC present in the sample.

Thus the energy input is selected to achieve the desired wavelength of iridescence; a small increase in wavelength requires a lower energy input than a large increase in wavelength, and it is a routine matter for the technician to determine or select the energy input based on parameters of the suspension, for example the total NCC content, to achieve a desired change in iridescence.

In general the aqueous suspension being sonicated has a concentration of NCC of 0.1% to 10% or just below the concentration at which gelation occurs, preferably 1% to 8%, more preferably 2 to 5%, by weight of the suspension; and the energy input is 50 to 25,000 joules/g, preferably 250 to 25,000 joules/g, of total NCC in the suspension being sonicated to shift the iridescence wavelength from a first wavelength to a second wavelength, where the second wavelength is longer than the first wavelength.

Thus in general the suspension concentration during sonication is selected to be below the gelation point (concentration at which the suspension is a gel); whereby the suspension is a flowable liquid. The concentration at which the suspension becomes a gel depends on variables such as the cellulose source from which the NCC is extracted, the density of charged groups on the NCC particle surface, the ionic strength or pH of the suspension, any chemical modifications made to the NCC, etc., and can be readily determined by routine experiment The sonication energy input needed to reach a specific film colour depends on the state of the initial NCC suspension used, which will depend on, among other things, the hydrolysis and processing conditions used to make it. That is, the original unsonicated NCC suspension may be evaporated into a yellow film or a blue one, depending on its previous treatment. A given shift or change in colour is obtained by a given energy input; for example a small change in colour can be achieved by a low energy input such as a 50 to 100 J/g NCC input; a very large change in colour can be achieved by a 10 000 J/g NCC input. Further sonication above 10 000 J/g NCC input will not necessarily change the visible colour/appearance of the resulting film much, since at this point the iridescence wavelength will almost certainly lie in the infrared (IR) region of the spectrum, but it will continue to shift the iridescence wavelength further into the IR.

The change in NCC film wavelength caused by sonication appears to slow down above a sonication energy input of around 2 000 to 3 000 J/g NCC.

Furthermore, a mixture of two NCC suspensions of different sonication levels will yield a film of colour intermediate between those expected for the individual suspensions; and this provides a further means of achieving a desired change in iridescence.

The method of the invention can be used to produce solid NCC films having iridescence wavelengths lying below the UV to above the IR regions of the electromagnetic spectrum.

According to the present invention. NCC suspensions, when subjected to mechanical energy input such as ultrasound treatment or high-shear mechanical forces prior to film formation by slow evaporation, produce solid NCC films having different iridescence wavelengths shifting toward the infrared region as the energy input is increased.

The extent of the wavelength shift caused by sonication depends mainly on the energy input per gram NCC present in the sample being sonicated. Sonication also creates iridescence in films prepared from freeze-dried sodium-form NCC that has been redispersed in water, the iridescence colours shifting toward the infrared region of the EM spectrum in the same manner as "never-dried" NCC suspensions. Unsonicated redispersed FD Na-NCC produces cloudy translucent films lacking iridescence. The mixing of suspensions of different sonication levels results in an NCC film of iridescence wavelength intermediate between those of the individual suspensions at the respective sonication levels. The effects of sonication appear to be permanent; at least one month after sonication treatment, an NCC suspension gives a film with identical iridescence to that of a film prepared from freshly-sonicated suspension.

Although sonication has been shown to increase the critical concentration of NCC required for chiral nematic phase formation, its effect on the properties of the chiral nematic phase itself has not been investigated [14]. It has been found, in accordance with the present invention, that the chiral nematic pitch in NCC suspensions of equal concentration increases with increasing sonication, while the concentration of NCC in the isotropic and chiral nematic phases is not affected. This indicates that the increase in pitch is due directly to the effects of sonication.

Thus, this invention provides a method for controlling the iridescence wavelength of NCC films without the addition of salts or other additives. In addition, the addition of salts such as sodium chloride results in the reversal of the wavelength shift induced by sonication, causing the iridescence to shift toward the ultraviolet region. Also in addition, sonication of suspensions to which salts such as sodium chloride has been added results in the reversal of the iridescence "blue-shift" by causing the iridescence to shift toward the infrared wavelength region. That is, the effects of sonication and added salt are mutually reversible.

As indicated above the mechanism whereby the mechanical energy lengthens the wavelength of iridescence in the NCC suspension is not fully understood or clarified. While not wishing to be bound by any particular theory, it is thought that the effect of sonication energy on NCC film properties must first arise in the bulk aqueous suspension to which the sonication is applied. Although sonication does not measurably change many important properties of NCC particles, it increases both the critical concentration required for phase separation of an NCC suspension and the chiral nematic pitch of the liquid crystal phase. Any proposed mechanism for sonication-induced pitch increase might also need to account for the other effects of sonication that have been observed in NCC suspensions and films.

Sonication does not reduce the degree of polymerization of the cellulose chains that make up the particles of NCC. In addition, sonication continues to affect the suspension properties and final film colour beyond the energy input at which particle dimensions (as measured by light scattering providing a spherical average of the particle size) are no longer significantly affected. Although sonication does not reduce the degree of sulfation of the NCC particles, it does appear to have an effect on the electrostatic properties of the NCC suspension; a measurable increase in NCC suspension conductivity is observed with increasing sonication, which appears to be correlated with particle size reduction and iridescence wavelength red-shift with increasing sonication. In addition, extensively purifying an NCC suspension by dialysis, red-shifts the resulting film iridescence compared to that of the original suspension, and also significantly reduces the effects of sonication (much smaller red-shifts are obtained) as well as the quality of the iridescence. Based on these and other experiments, it seems likely that the effect of ultrasonic energy on NCC is electrostatic in nature. Two mechanisms by which sonication may increase the chiral nematic pitch are proposed:

Ions Trapped in the Bound-Water Layer.

The hydrolysis used to extract the NCC from the wood pulp is performed at very high acid concentration; protons and sulfate ions may remain trapped in the bound-water layer (BWL) surrounding the NCC particles after purification by dialysis. When an NCC suspension is sonicated, some of the ions trapped in the BWL may be released and diffuse in the bulk suspension, thereby preventing or hindering their return to the BWL. The electrostatic double layer is thought to screen the "chiral interaction" between NCC rods [13]; if it were no longer suppressed by the surrounding ions in the BWL, the NCC particles would experience weaker chiral interactions, leading to a larger chiral nematic pitch.

Oligosaccharide Gel Layer.

Kinetics of the NCC carbanilation reaction with phenyl isocyanate as followed by SEC suggest that the cellulose chain degree of polymerization increases towards the interior of the NCC particles, a higher proportion of oligosaccharides being located at the particle surface. There may therefore be a layer of oligosaccharides surrounding the NCC particles, which may have re-precipitated onto the NCC during quenching of the hydrolytic reaction with water. During sonication, the sulfated oligosaccharides may be partially released into the bulk suspension, or the oligosaccharide gel layer may become more swollen. Fewer sulfated oligosaccharides in close proximity to the NCC particles would allow the EDL to better screen the chiral interactions as described above, while the swollen gel layer would increase the excluded volume of the NCC particles, leading to an increase in pitch.

The two mechanisms proposed above are somewhat speculative; a combination of these or other mechanisms may be responsible for the observed effects of sonication on NCC suspensions and films. For example, ions may be trapped in an oligosaccharide gel layer and released upon sonication.

The present invention is illustrated by, but not limited to, the following examples:

EXAMPLES

General Procedure A

Sonication of NCC Suspension without Cooling

A known volume (15-25 mL) of NCC suspension of known concentration (1-5% NCC (w/w)) is placed in a 50-mL plastic centrifuge tube. The sonicator probe (6 mm diameter) is placed halfway into the liquid. The suspension is sonicated at 50-80% amplitude (preferably 60-70% amplitude or 8-10 watts) in 4-second pulses with 4-second intervals between to a given energy input (up to 1500 J). The suspension is then poured into a polystyrene Petri dish (90 mm diameter) and allowed to evaporate slowly at ambient conditions (20-25° C., 20-60% relative humidity). The resulting solid NCC film's optical properties are measured with a goniospectrophotometer to obtain the dominant wavelengths of reflection at 45° incident illumination with a D65 illuminant.

General Procedure B

Sonication of NCC Suspension with Cooling

A known volume (15-25 mL) of NCC suspension of known concentration (1-5% NCC (w/w)) is placed in a 30-mL capacity glass Rosett cooling cell. The sonicator probe (6 mm diameter) is placed halfway into the liquid and the cooling cell placed in an ice bath. The suspension is sonicated as described in General Procedure A above. A solid NCC film is then prepared and characterized as described in General Procedure A above.

General Procedure C

Sonication of Redispersed Freeze-Dried Na-NCC

To a known volume of acid-form NCC suspension at a known concentration is added aqueous sodium hydroxide of known concentration (0.02-2 M) with stirring, until the pH of the NCC suspension is between 5-7, preferably 6.5-7. The suspension is then frozen to −65 to −80° C. and lyophilized at 50-100 mTorr to give freeze-dried sodium-form NCC (FD Na-NCC). A known amount of solid is redispersed in deionized water to give a known concentration of NCC (1-5% (w/w)) and vortexed at high speed to ensure complete and homogeneous dispersion. The redispersed FD Na-NCC suspension is then treated as described in General Procedure A above and the resulting film characterized as described in General Procedure A above.

General Procedure D

High-Shear Mechanical Treatment of Dilute NCC Suspension

A dilute (2.5-3.0% (w/w)) liquid suspension of nanocrystalline cellulose (10-30 L) is passed through a high-pressure pump homogenizer in a single pass with a driving pressure of 3000 psi, which causes the suspension to pass through a small diameter orifice in which it is subjected to a large pressure drop and a combination of impingement, cavitation and shear forces which disrupt any aggregates. The resulting suspension is then concentrated by evaporation or hollow fiber membrane treatment to a solids content of 1-5% NCC (w/w). Known volumes of acid-form NCC suspension at a known concentration are then poured into polystyrene Petri dishes and allowed to evaporate slowly at ambient conditions (20-25° C., 20-65% relative humidity) to give solid NCC films. The films are then characterized as described in General Procedure A above.

Example 1

Figure 3:
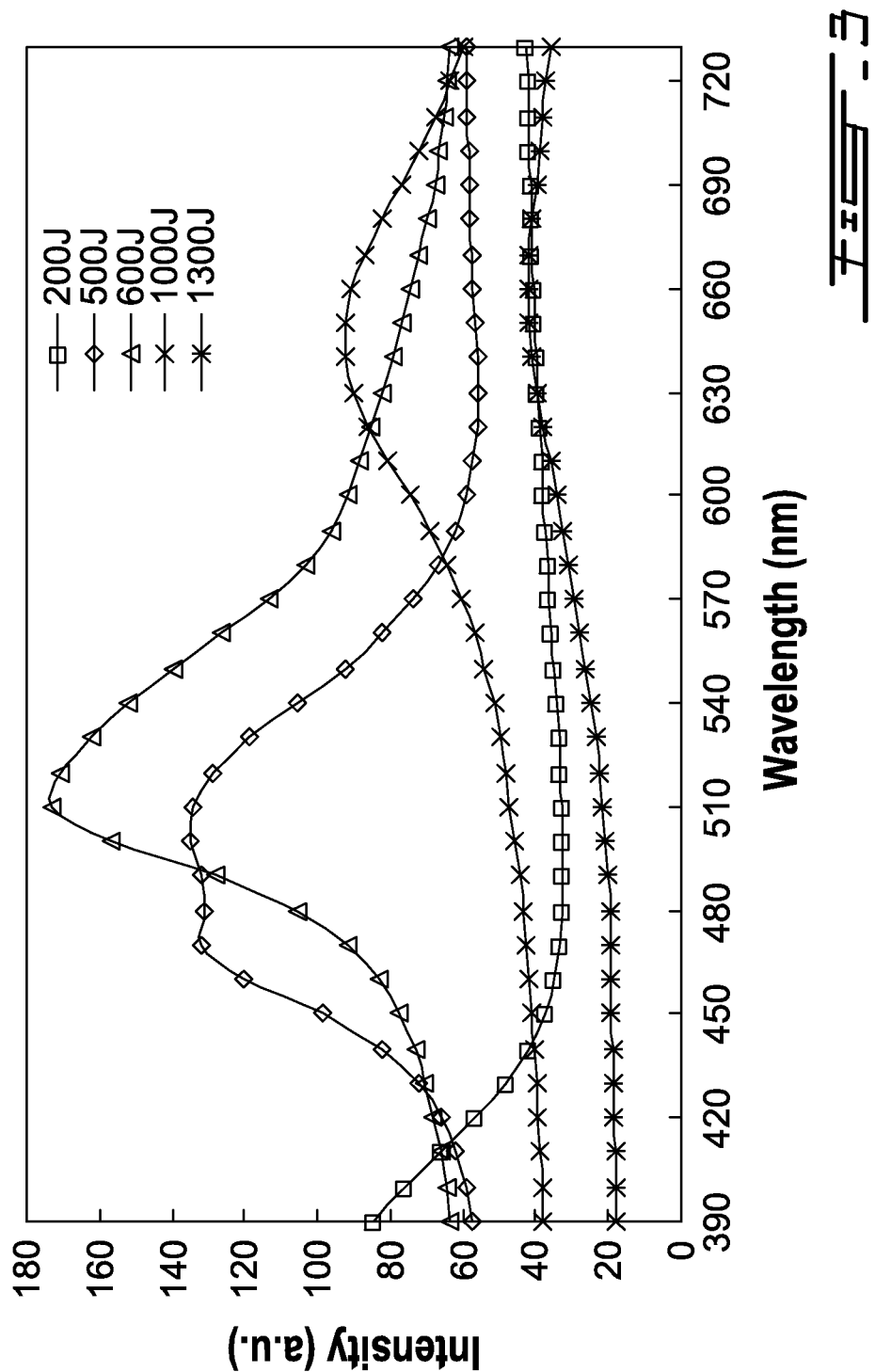
FIG. 3 shows the reflection spectra of H-NCC films produced from suspensions sonicated from 0 to 1300 J.

Increasing Sonication Energy 15-mL aliquots of a 2.8% (w/w) acid-form NCC(H-NCC) suspension were sonicated according to General Procedure A disclosed above, with energy inputs ranging from 0 to 1300 J, and dried at ambient conditions into solid H-NCC films. The resulting films exhibit iridescence in reflected light with colours ranging from very faint bluish to gold-green. The dominant wavelength of reflection at 45° incident D65 illumination and 45° reflection shifted from <390 nm at 200 J sonication to ~660 nm at 1300 J (see FIG. 3).

Figure 4:
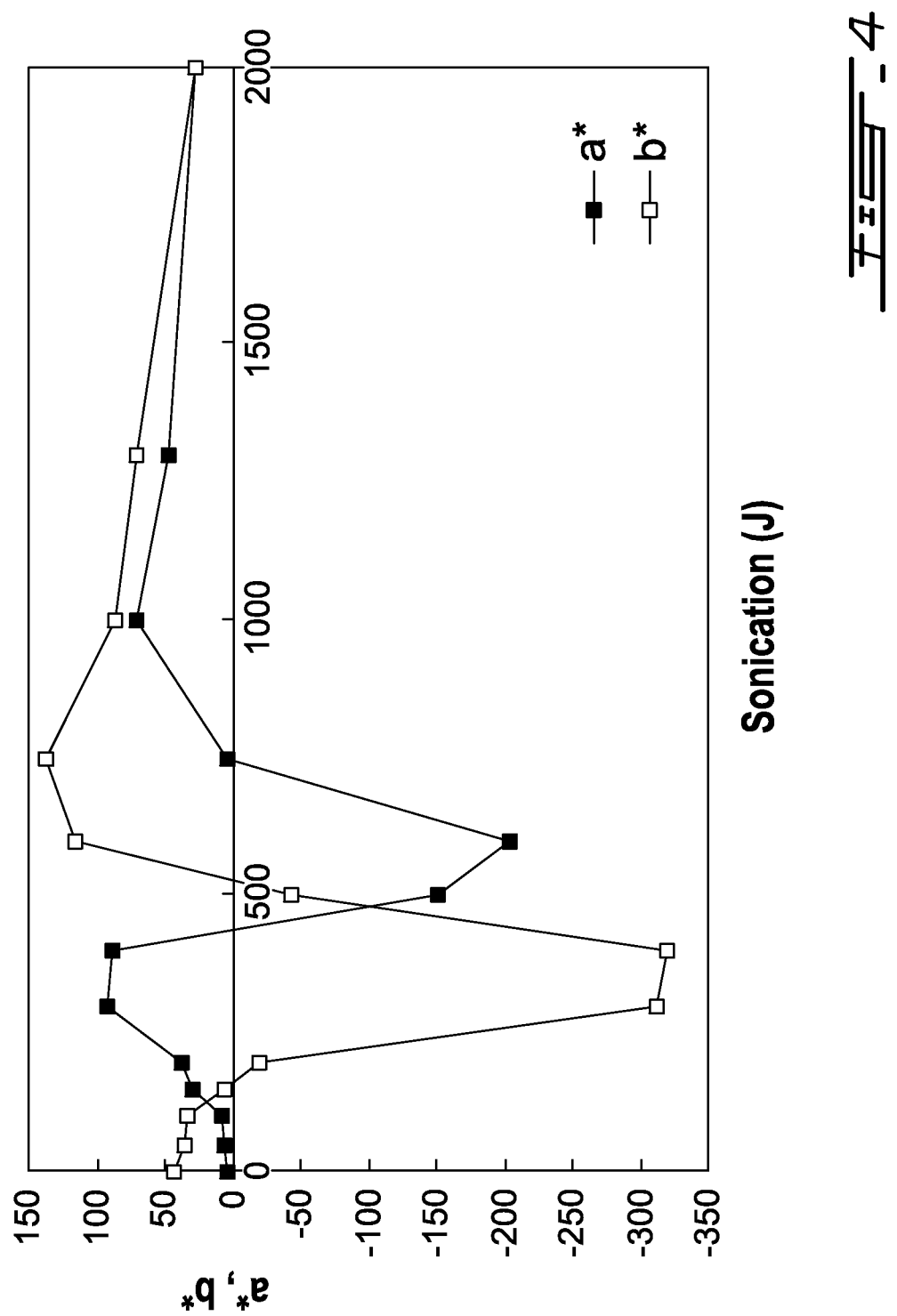
FIG. 4 shows CIE a* and b* values as a function of sonication for H-NCC films.

A plot of a* and b* values (CIE) measured at 45° incident D65 illumination and 45° reflection angle shows similar trends in the a* and b* values with increasing sonication (see FIG. 4). The a* values are initially close to zero, as expected for a blue/ultraviolet film, then increase to positive (red) values while the b* values decrease to very negative (blue) values, again as expected for blue films gradually shifting towards longer wavelengths. The a* values then become negative (green) at ~400-500 J sonication, while b* values become positive (yellow). Green to yellow films are therefore expected, and are indeed observed. Above 750 J sonication, both a* and b* are positive (red and yellow, respectively), with both approaching zero as sonication increases and the reflection wavelength shifts towards the infrared region.

It is unlikely that any differences in suspension heating due to the sonication without cooling caused the observed colour variation: Heat-induced desulfation of H-NCC, which may affect the iridescence wavelength (after dialysis of the suspension to remove the liberated sulfate ions) [20], occurs at temperatures above 40-50° C. over a period of at least several hours [30]; in this case, sonication times were less than 7 minutes, with the suspension temperature only reaching a maximum of 40° C.

Example 2

Figure 5:
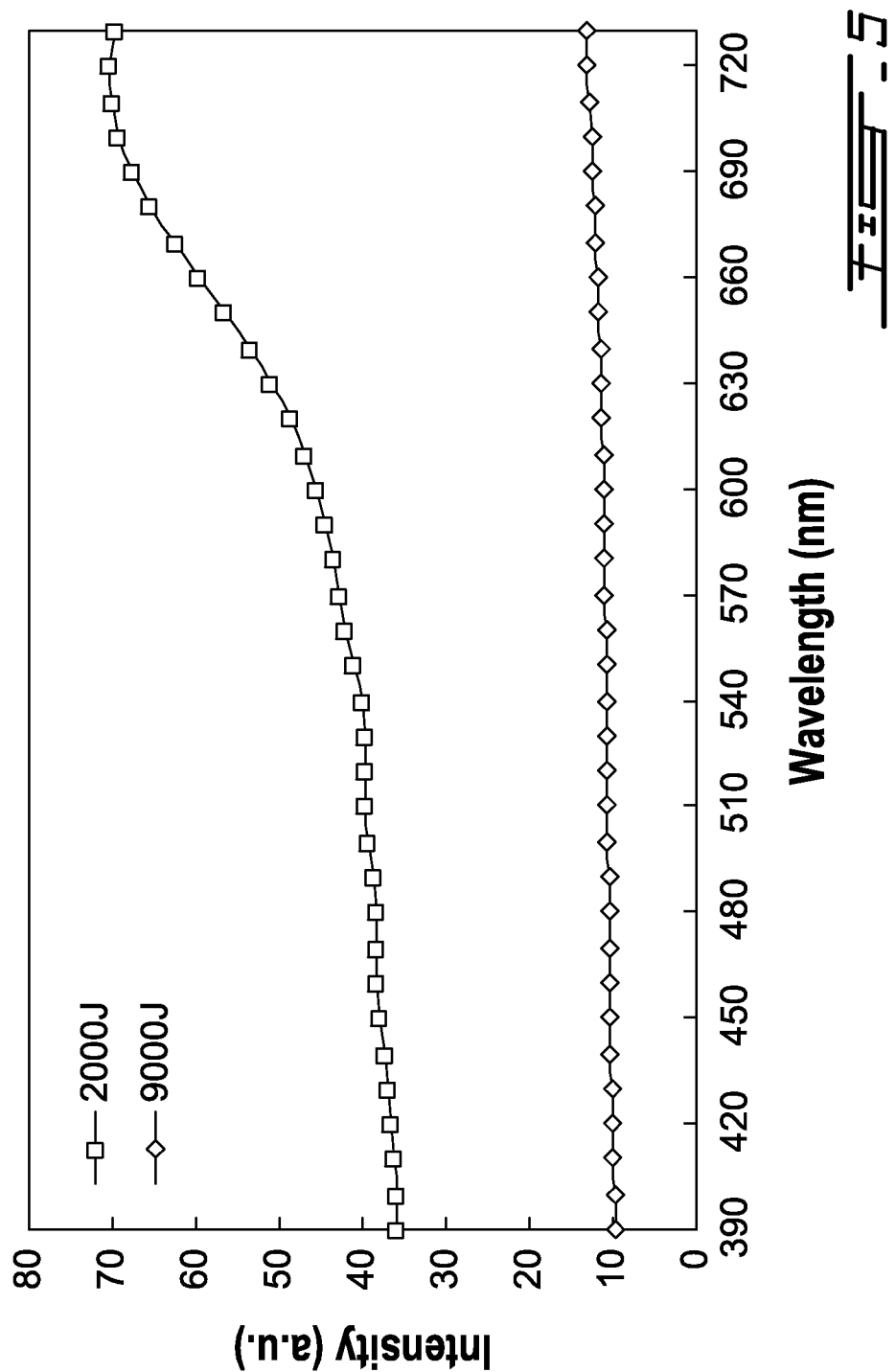
FIG. 5 shows reflection spectra for H-NCC films produced from suspensions sonicated from 2000 to 9000 J in a cooling cell.

Increasing Sonication Energy with Cooling 15-mL aliquots of a 2.8% (w/w) acid-form NCC suspension were sonicated according to General Procedure B disclosed above, with energy inputs ranging from 2000 to 9000 J, and dried at ambient conditions into solid NCC films. The resulting films exhibit iridescence in reflected light with wavelengths in the infrared region of the electromagnetic spectrum (see FIG. 5). The dominant wavelength of reflection at 45° incident D65 illumination and 45° reflection shifted from 710 nm at 2000 J sonication to greater than 730 nm at 9000 J (see FIG. 5). The mechanism causing the wavelength shift is not desulfation due to (localized) heating from sonication, as sonication has not been found to have an effect on sulfur content when cooling is used [14].

Example 3

Suspension Volume During Sonication

Figure 6:
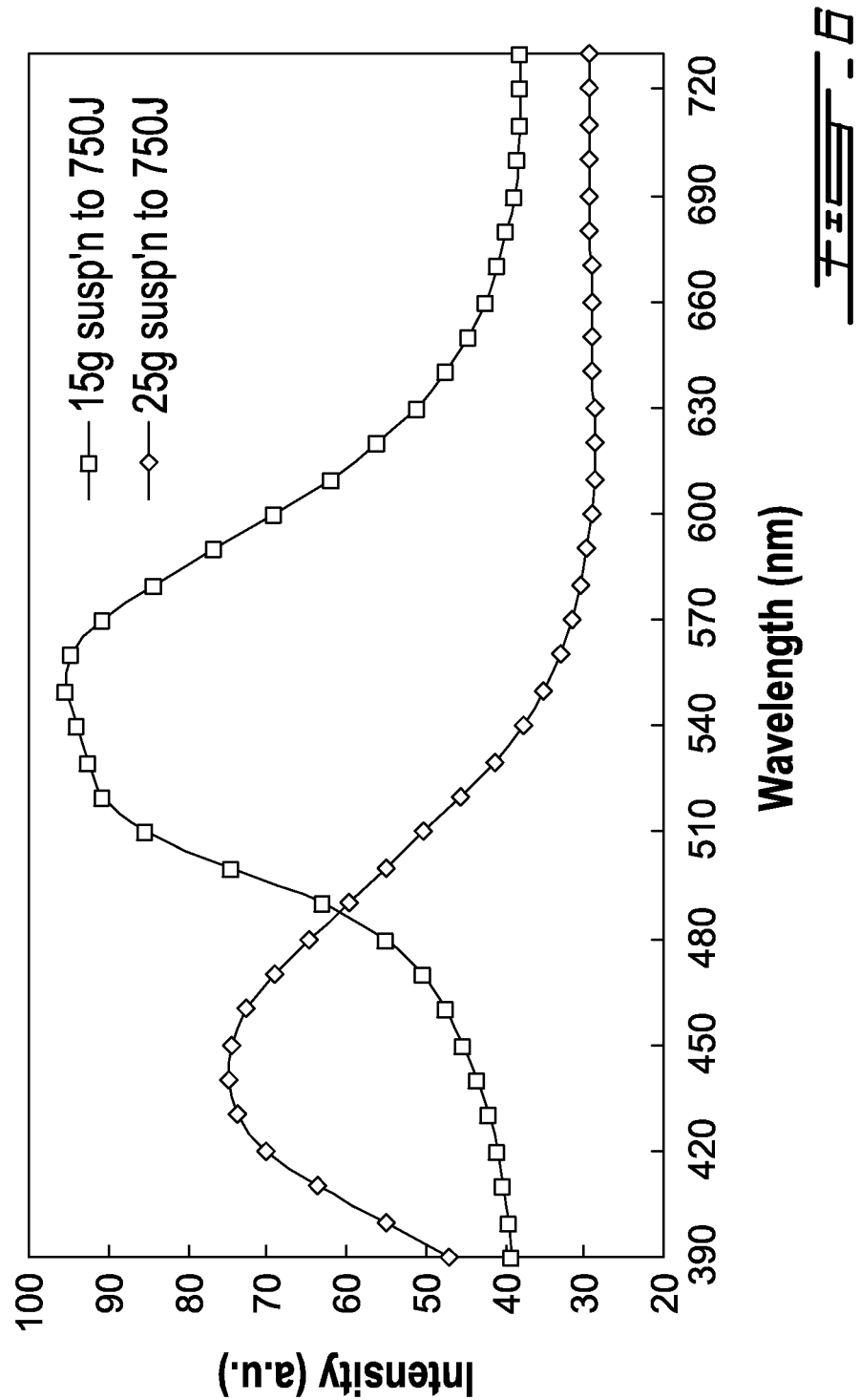
FIG. 6 shows reflection spectra for H-NCC films produced from suspensions of different mass sonicated to 750 J.

Experiments performed in this lab have shown that NCC film basis weight alone has not been found to affect the iridescence colour of the NCC films; accordingly, 15- and 25-mL aliquots of a 2.8% (w/w) acid-form NCC suspension were sonicated to 750 J energy input according to General Procedure A disclosed above and dried at ambient conditions into solid NCC films. The resulting films exhibit iridescence in reflected light with wavelengths in the visible region of the electromagnetic spectrum. Everything being equal, sonicating smaller samples produces films reflecting longer wavelengths: The 15-mL aliquot film reflects red/orange light normal to the film surface, while the 25-mL aliquot film reflects in the yellow-green region of the spectrum. The dominant wavelength of reflection at 45° incident D65 illumination and 45° reflection blue-shifted from 550-560 nm for the 15-mL aliquot to 440 nm for the 25-mL aliquot (see FIG. 6).

Example 4

Suspension Concentration During Sonication

Figure 7:
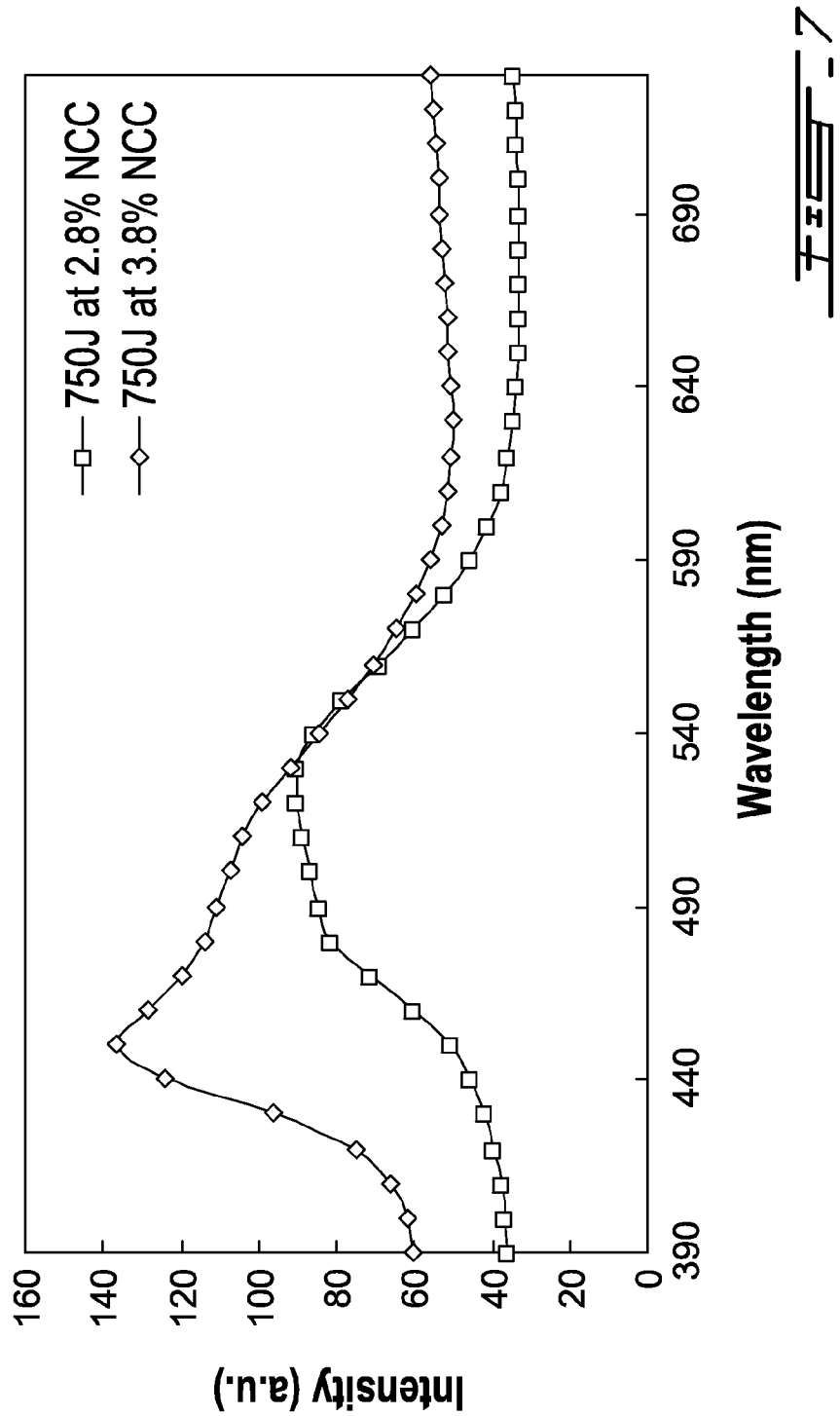
FIG. 7 shows reflection spectra for H-NCC films produced from suspensions of different concentration sonicated to 750 J.

Aliquots (15 mL) of 2.8% and 3.8% (w/w) acid-form NCC suspensions are sonicated to 750 J energy input according to General Procedure A disclosed above and dried at ambient conditions into solid NCC films. The resulting films exhibit iridescence in reflected light with wavelengths in the visible region of the electromagnetic spectrum. Everything else being equal, sonicating more dilute NCC suspensions produces films reflecting longer wavelengths: The film produced from 2.8% H-NCC (w/w) reflects orange-yellow light normal to the film surface, while the film produced from 3.8% H—NCC (w/w) suspension reflects in the yellow-green region of the spectrum. The dominant wavelength of reflection at 45° incident D65 illumination and 45° reflection blue-shifted from 530-540 nm for the less concentrated sample to 450 nm for the more concentrated sample (see FIG. 7). The film's basis weight has not been found to affect the wavelength of iridescence within the range used here.

Examples 3 and 4 together demonstrate that it is in fact the sonication energy input per gram NCC which is the relevant parameter in determining the final iridescence colour of the films.

Example 5

Sonication Amplitude (Power)

Figure 8:
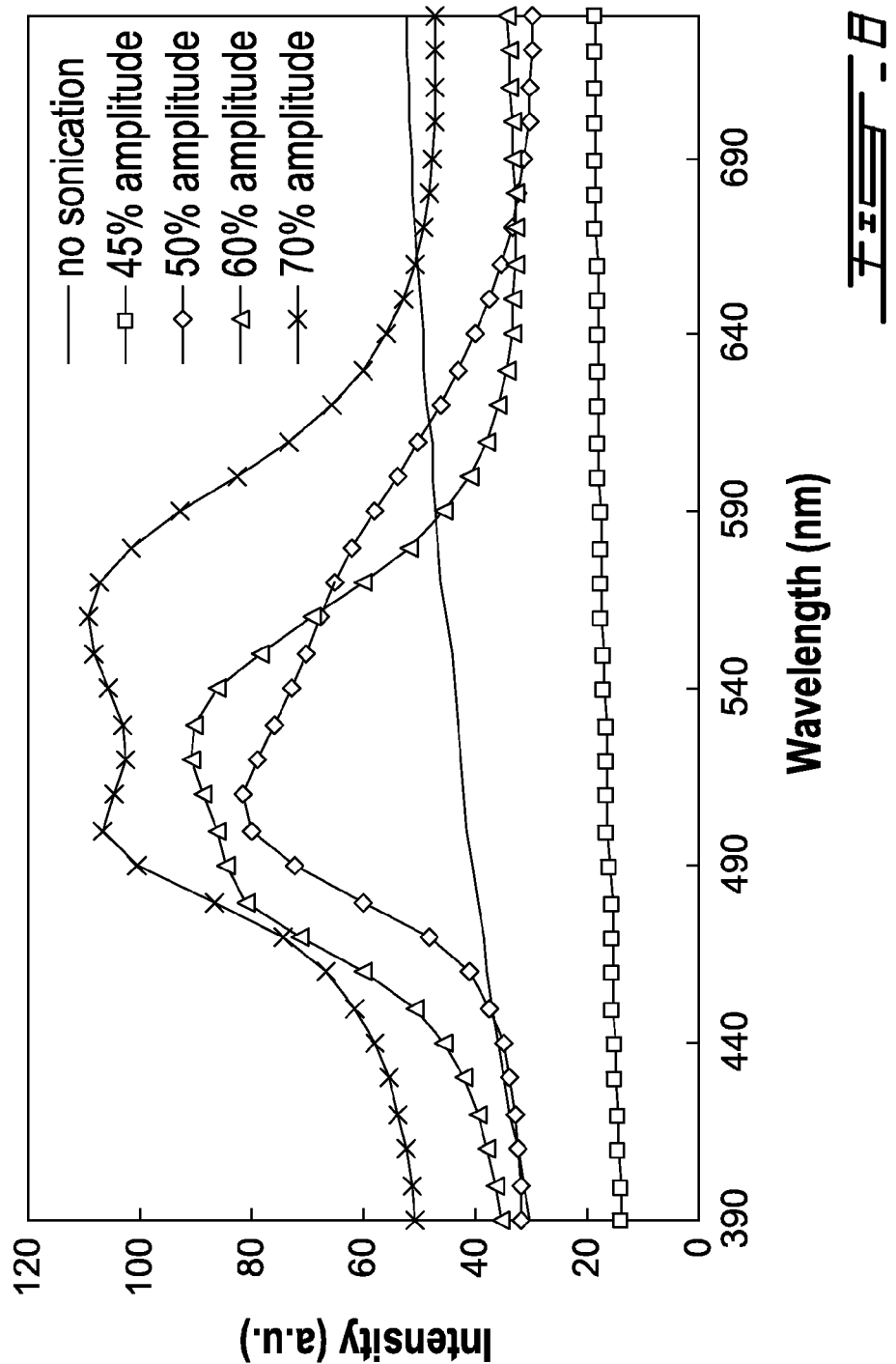
FIG. 8 shows reflection spectra for H-NCC films produced from suspensions sonicated with increasing amplitude.

Aliquots (15 mL) of 2.8% (w/w) H-NCC suspensions are sonicated to 750 J energy input according to General Procedure A disclosed above, while varying the sonication amplitude from 45% (4-5 watts) to 70% (10 watts), and dried at ambient conditions into solid NCC films. The resulting films exhibit iridescence in reflected light with wavelengths in the visible region of the electromagnetic spectrum. At the lowest sonication amplitude, the NCC film reflects shorter wavelengths (in the blue-violet region, similar to the spectrum of films made with unsonicated suspension but slightly longer wavelength), while at 50% amplitude (5-6 watts) and above, the resulting films reflect at longer wavelengths in the orange/red region of the electromagnetic spectrum. The iridescence wavelength does not appear to be sensitive to the sonication amplitude. The dominant wavelength of reflection at 45° incident D65 illumination and 45° reflection shifted from above 730 nm for the 45% amplitude sample to 530-570 nm for the 50-75% amplitude samples (see FIG. 8).

Example 6

Sonicating Redispersed Freeze-Dried Na-NCC

Solid freeze-dried sodium-form NCC (FD Na-NCC, 0.129 g) is redispersed in 4.63 mL of deionized water to give a suspension of 2.8% NCC (w/w) and vortexed at high speed for 1-2 min until homogeneous dispersion is achieved. The redispersed FD Na-NCC suspension is then sonicated from 0-750 J as described in General Procedure A above, placed in 48-mm diameter plastic Petri dishes and allowed to evaporate at ambient conditions. The resulting films show iridescence in the visible range at sonication levels above 150 J, shifting from yellow-green to red-orange at 750 J. In contrast to the film of unsonicated H-NCC suspension described in Example 1 above, the unsonicated redispersed FD Na-NCC film does not exhibit any iridescence, but is a translucent uniform grey colour.

Example 7

Reversibility of Sonication-Induced Red-Shift by Salt Addition

Figure 9:
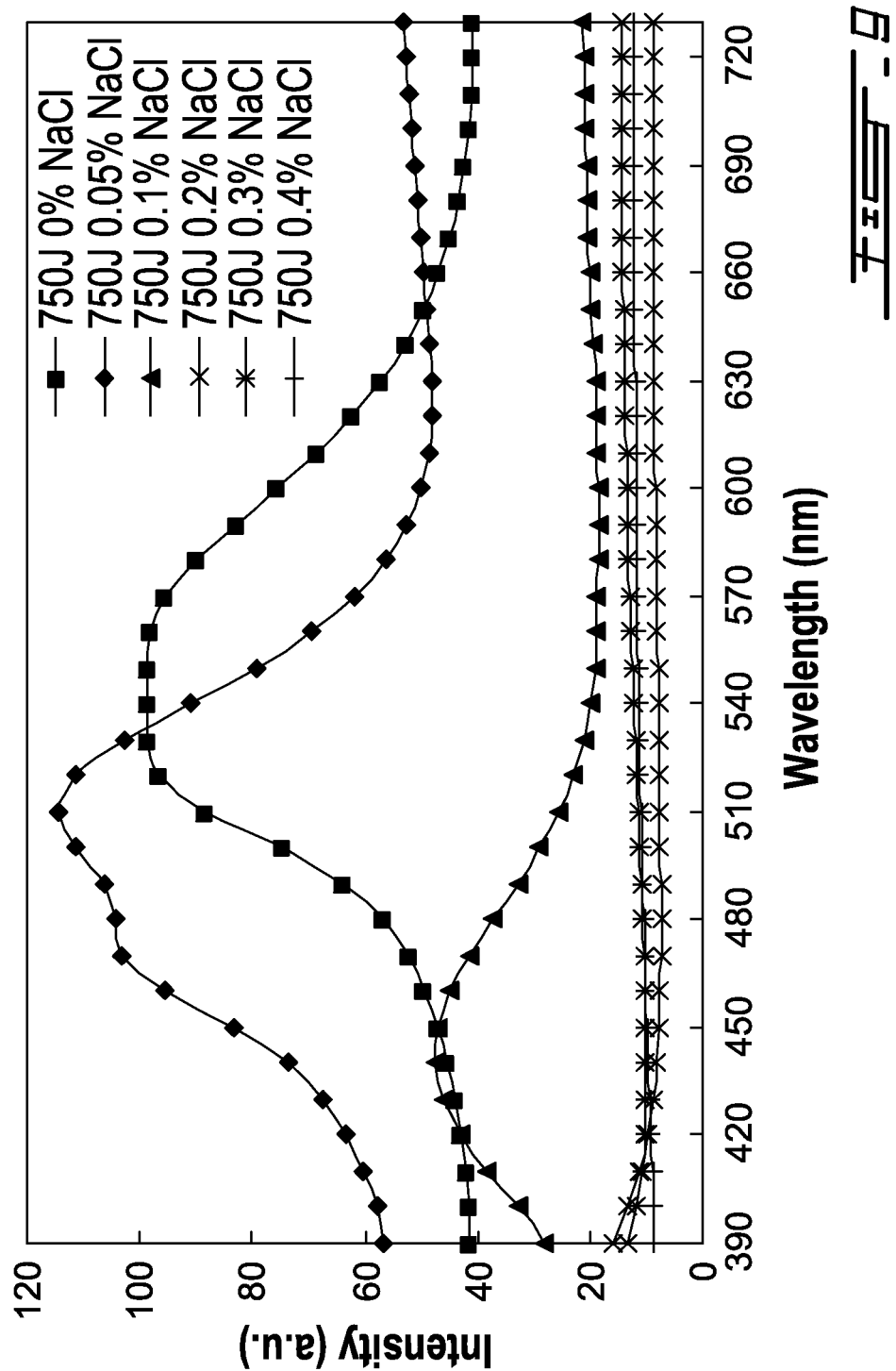
FIG. 9 shows reflection spectra for H-NCC films produced with 750 J of sonication followed by the addition of increasing amounts of NaCl.
Figure 10:
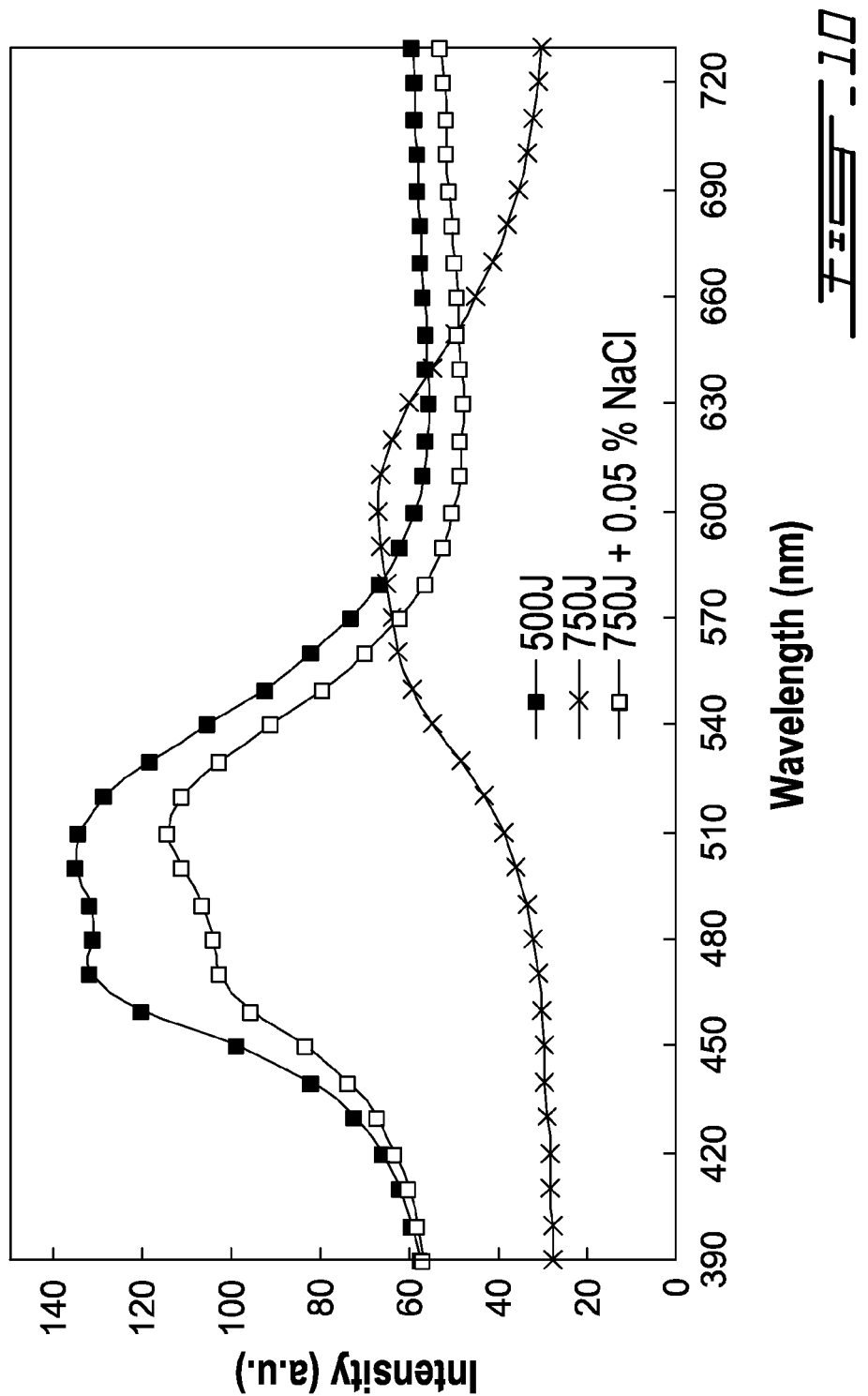
FIG. 10 shows reflection spectra for H-NCC films demonstrating the reversal of the effects of sonication by the addition of a small amount of salt.

Aliquots (15 mL) of 2.8% (w/w) acid-form NCC suspensions are sonicated to 750 J energy input according to General Procedure A disclosed above. Following this, 0.175 to 1.4 mL of 20 mM NaCl (aq) are added to the suspensions, which are vortexed at high speed for 10 s to ensure homogeneous mixing. The suspensions are then placed in 90-mm diameter Petri dishes and dried at ambient conditions into solid NCC films. The resulting films contain from 0.05 to 0.40% NaCl (w/w on dry NCC) and exhibit iridescence in reflected light with wavelengths in the visible and UV regions of the electromagnetic spectrum. As expected from the literature [20], as the NaCl content increases, with 45° incident D65 illumination, the dominant wavelength of reflection at 45 degrees shifts to shorter values (from 550 nm in the absence of NaCl, to 440 nm at 0.10% NaCl (w/w on NCC) and <390 nm at higher NaCl contents, see FIG. 9). The spectra of H-NCC films prepared with a) 500 J sonication, and b) 750 J sonication+ 0.05% NaCl (w/w on NCC) are almost identical (see FIG. 10), indicating that the iridescence wavelength shift caused by sonication is reversible upon addition of a small amount of salt such as NaCl to the suspension.

It has been found that the order of salt addition and sonication does not affect the optical properties of the resulting film; that is, the salt-induced iridescence blue-shift can be reversed by sonication as well. The potential exists for more precise controlling of iridescence colours by means of addition of salts, allowing more flexibility and even the correction of production errors without wasting NCC material.

Example 8

Resin Treatment and High-Shear Homogenization

Suspensions of H-NCC are prepared from fully bleached softwood kraft pulp according to the following methods:

Method 1: Fully bleached softwood kraft pulp was hydrolyzed with 64% (w/w) $H_2SO_4$ according to literature procedure [14]. The mixture was then quenched with DI water. Excess acid was removed by decanting the supernatant followed by washing and decanting twice more. The mixture was filtered, passed through a column containing mixed-bed ion exchange resin, concentrated to 2.8% NCC (w/w), then filtered again to remove large aggregates. The final suspension pH was 3.21.

Method 2: Fully bleached softwood kraft pulp was hydrolyzed with 64% (w/w) $H_2SO_4$ according to literature procedure [14]. The mixture was then quenched with DI water and excess acid was removed by decanting and washing as above. The mixture was dialyzed and then concentrated to 2.41% NCC (w/w), after which the mixture was passed through a high-pressure pump homogenizer at 3000 psi (one pass) as described in General Procedure D above. It was then filtered to remove large aggregates. The final suspension pH was 2.54.

Figure 11:
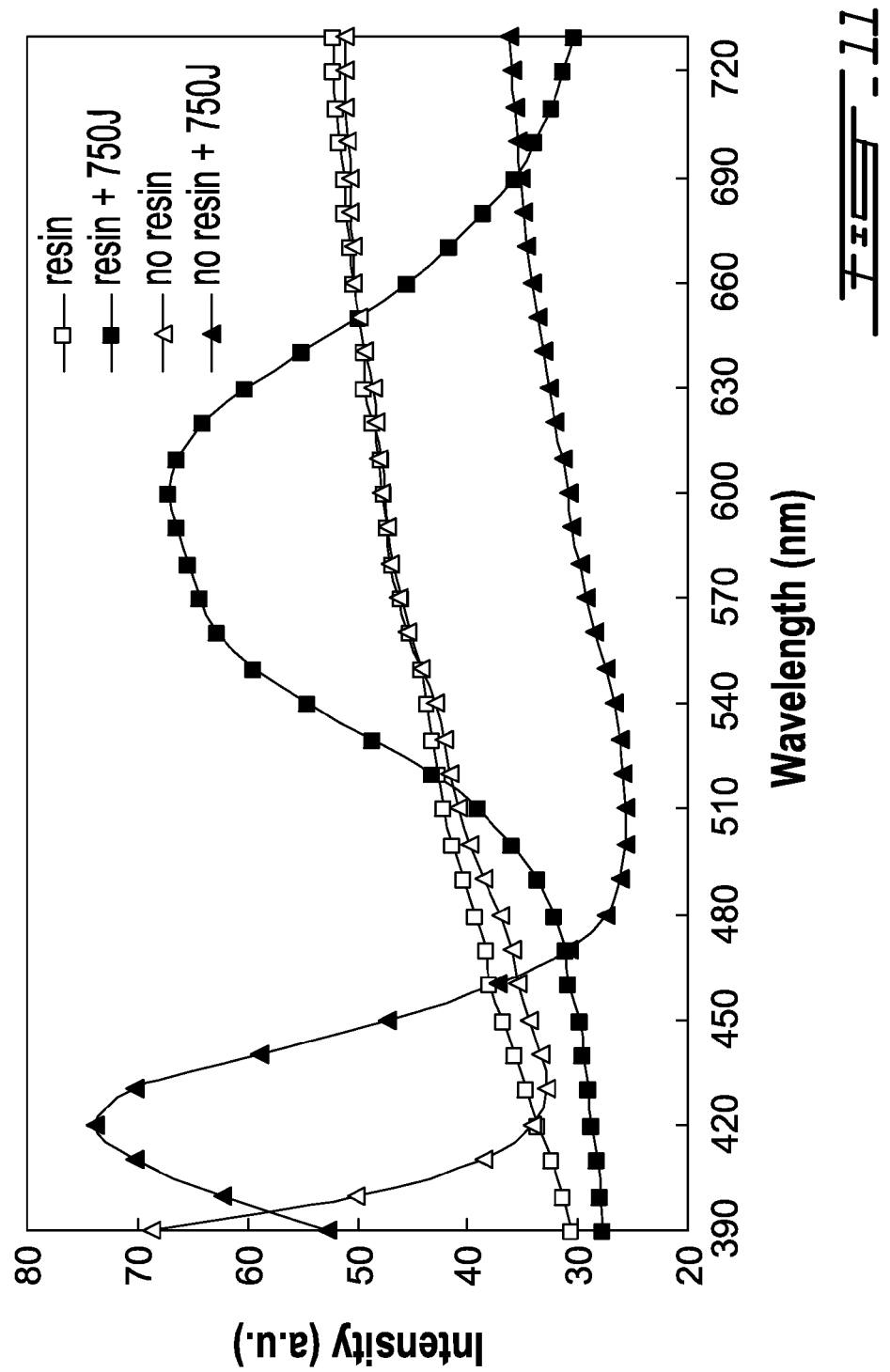
FIG. 11 shows reflection spectra for H-NCC films produced from suspensions sonicated before and after ion exchange resin treatment.

Following filtration through a Whatman G/F glass microfibre filter (700 nm pore size), 15-mL aliquots of suspension at concentrations of 2.78% and 2.41% NCC (w/w) for Methods 1 and 2, respectively, were prepared with no sonication and with 750 J sonication, placed in polystyrene Petri dishes and dried by evaporation at ambient conditions (20-25° C. and 50-60% relative humidity) to give solid NCC films which were analyzed as described in General Procedure A above. In FIG. 11, the reflection spectra taken in 45° incident D65 illumination at 45° reflection show that sonication of an NCC suspension prepared without ion-exchange resin treatment (triangles) induces a small red-shift of film iridescence of around 30 to 50 nm, while an NCC suspension prepared with ion-exchange resin treatment exhibits a much larger red-shift (greater than 200 nm) with the same sonication. The ion exchange resin does not affect the NCC particle size as measured by photon correlation spectroscopy in 10 mM NaCl, nor does it noticeably affect the suspension particle concentration or pH.

Example 9

High-Shear Homogenization Following Mixed-Bed Ion Exchange Resin Treatment

Figure 12:
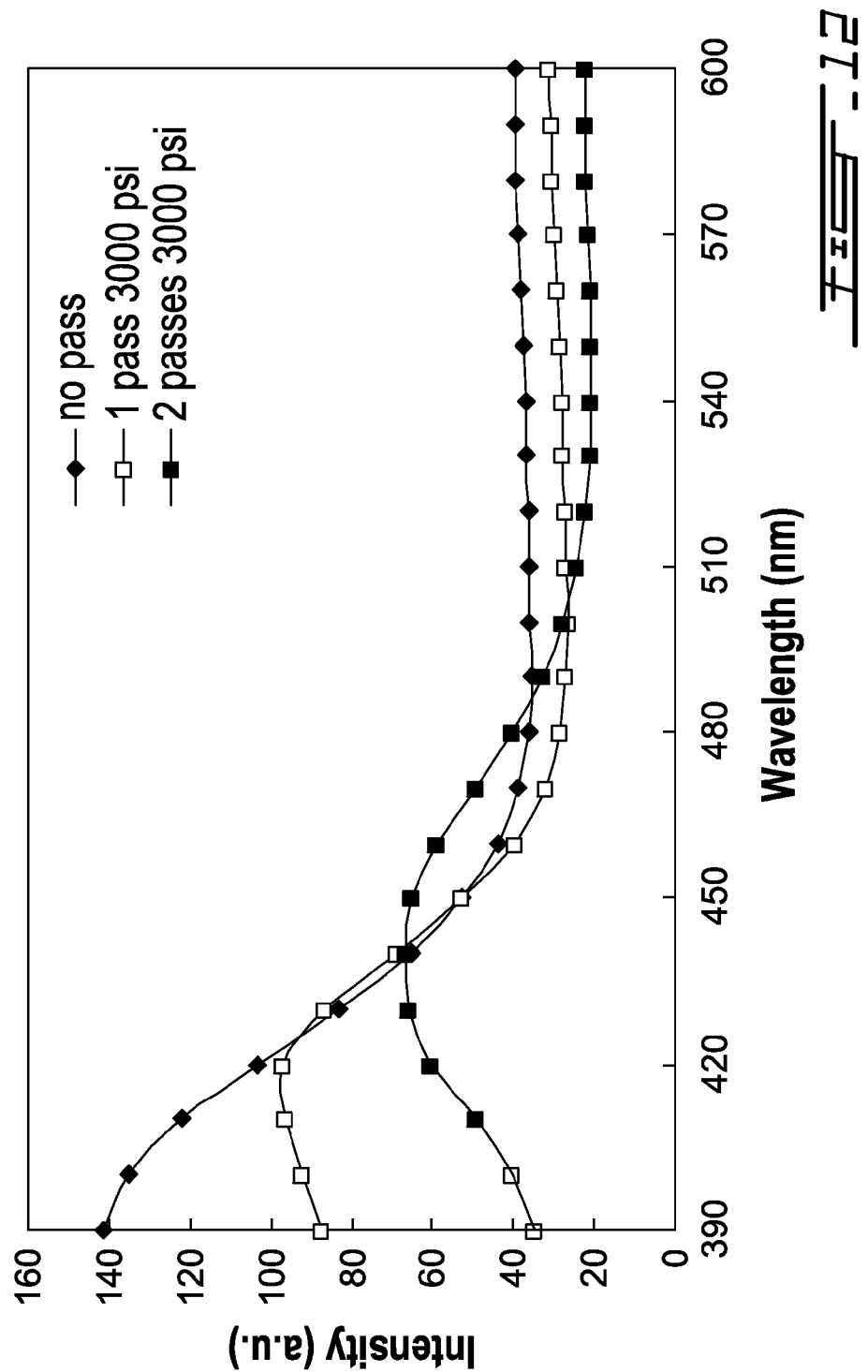
FIG. 12 shows reflection spectra for H-NCC films produced from ion exchange resin-treated suspension with increasing homogenization.

A suspension prepared according to Method 2 in Example 8 and then treated with mixed-bed ($H^+/OH^-$) ion exchange resin, and subsequently homogenized at 3000 psi (zero, one or two passes, 1 L, 2.7% (w/w)), gives films with iridescence wavelengths at 45° reflection in 45° D65 illumination as shown in FIG. 12. This indicates that high-shear homogenization has a similar (but weaker) effect to sonication.

Example 10

Mixing of NCC Suspensions Sonicated to Different Extents

Figure 13:
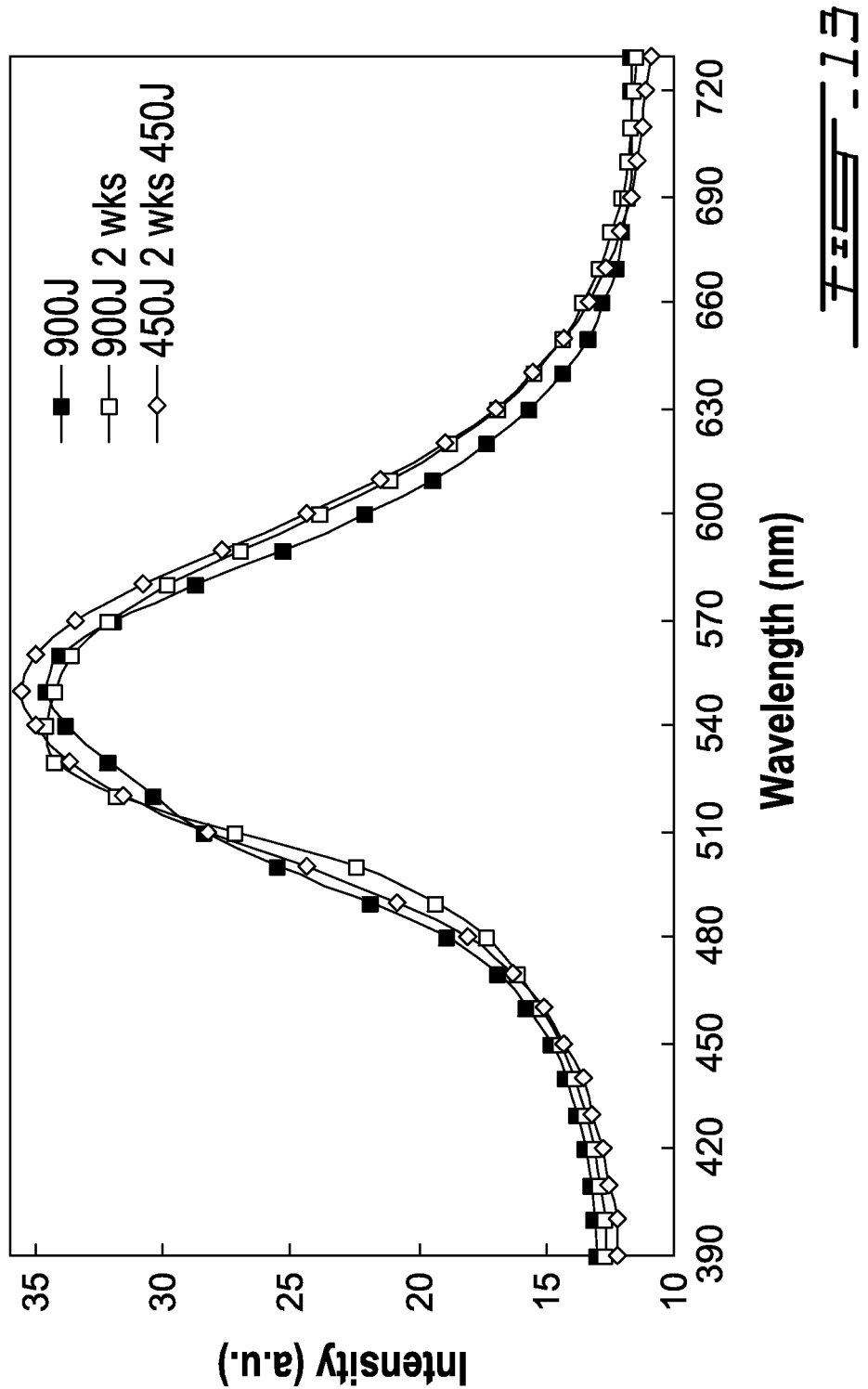
FIG. 13 shows reflection spectra for H-NCC films produced from suspensions immediately following sonication, and from suspensions stored 2 weeks following sonication.

Aliquots (15 mL) of 2.7% (w/w) acid-form NCC suspensions are sonicated to 300 J and 900 J energy inputs according to General Procedure A disclosed above. Films are prepared from: a) 15 mL of 300-J suspension, b) 15 mL of 900-J suspension, and c) 7.5 mL of 300-J suspension+7.5 mL of 900-J suspension mixed together. All suspensions are dried at ambient conditions into solid NCC films. The resulting films exhibit iridescence in reflected light with wavelengths in the visible region of the electromagnetic spectrum. The wavelength of reflection for 45° incident D65 illumination and 45° reflection angle of the film prepared from a mixture of 300-J and 900-J suspensions is intermediate between the wavelengths of reflection of the other two films, almost identical to that of a film produced from a suspension sonicated to 600 J (see FIG. 13).

Example 11

Stability of Sonication Effect on NCC Suspensions

Figure 14:
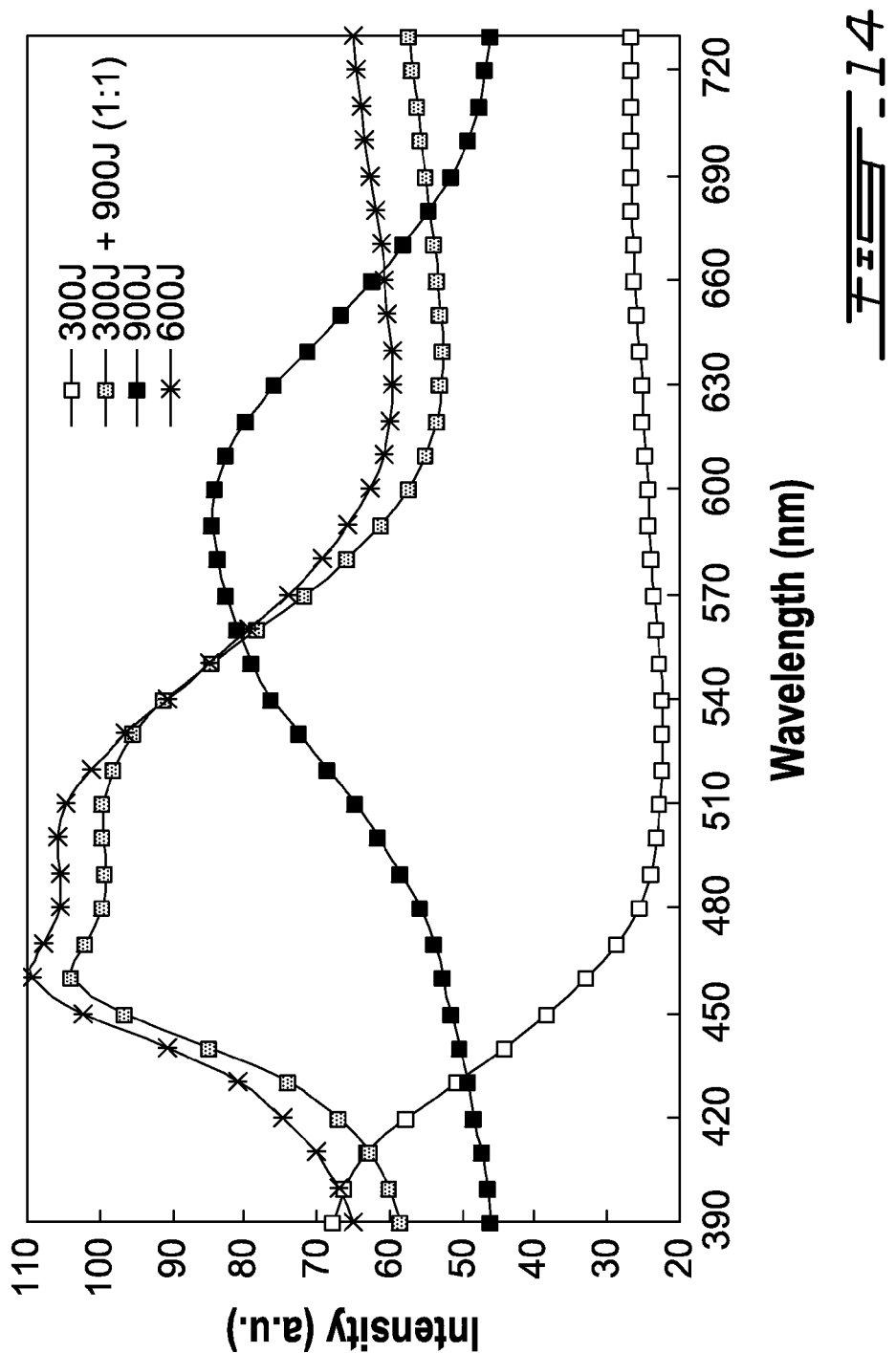
FIG. 14 shows reflection spectra for H-NCC films produced from suspensions sonicated to 300 J and 900 J, and by mixing equal parts of these suspensions.

Aliquots (15 mL) of 2.77% (w/w) H-NCC were a) sonicated to 900 J energy input and a film prepared; b) sonicated to 450 J energy input, stored for 2 weeks at 4° C., sonicated to 450 J energy input and a film prepared; and c) sonicated to 900 J energy input, stored for 2 weeks at 4° C. and a film prepared. Reflectance spectra taken in 45° D65 illumination at 45° reflection angle of the films are shown in FIG. 14 (the intensities have been adjusted for easier comparison). The spectra are nearly identical, indicating that the effects of sonication are stable during a storage period of at least two weeks. Another experiment has shown that the sonication effects remain stable for a period of at least one month.

Example 12

Effects of Sonication on NCC Suspension Properties and Behaviour

Aliquots (15 mL) of 5% (w/w) H-NCC were sonicated to different energy inputs and allowed to phase separate in sealed glass vials at ambient conditions, over a period of 48 to 72 hours. Upon phase separation, the volume fraction of each phase was calculated from their heights and the concentration of each phase determined by gravimetry. Samples taken from each suspension immediately after sonication were placed in flat glass tubes (0.4-mm optical path length) and allowed to phase separate as well. The chiral nematic pitch of the liquid crystalline phase was determined by polarized light optical microscopy. The results were as follows:

TABLE 1

Effect of sonication on phase behaviour and properties of 5% (w/w) H-NCC.

| Sonication (J) | Volume fraction CN phase | $[NCC]_I$ (wt %) | $[NCC]_{CN}$ (wt %) | Average P (μm) |
|---|---|---|---|---|
| 0 | >0.9 | — | — | 3.4 |
| 100 | 0.70 | 4.3 | 4.8 | 6.6 |
| 500 | 0.65 | 4.7 | 5.2 | 7.2 |
| 1000 | 0.57 | 4.7 | 5.3 | 15.7 |
| 2000 | 0.46 | 4.3 | 4.8 | 19.2 |

It can be seen that sonication causes the volume fraction and the chiral nematic pitch of the NCC liquid crystalline phase to decrease.

REFERENCES

1. French, A. D.; Bertonière, N. R.; Battista, O. A.; Cuculo, J. A.; Gray, D. G., "Cellulose", in *Kirk-Othmer Encyclopedia of Chemical Technology*, 4$^{th}$ ed. New York: John Wiley & Sons, 1993.
2. Sarko, A.; Marchessault, R. H. *J Polym. Sci., Part C: Polym. Symp.* 1969, 28, 317-3.31.
3. Mark, H. J. *Phys. Chem.* 1940, 44, 764-787.
4. Earl, W. L.; VanderHart, D. L. *Macromolecules* 1981, 14, 570-574.
5. Fink, H. P.; Philipp, B.; Paul, D.; Serimaa, R.; Paakkari, T. *Polymer* 1987, 28, 1265-1270.
6. Battista, O. A.; Coppick, S.; Howsmon, J. A.; Morehead, F. F.; Sisson, W. A. *Ind. Eng. Chem.* 1956, 48, 333-335.
7. Marchessault, R. H.; Morehead, F. F.; Koch, M. J. *J. Colloid Sci.* 1961, 16, 327-344.
8. Grunert, M.; Winter, W. T. *J. Polym. Environ.* 2002, 10, 27-30.
9. Favier, V.; Chanzy, H.; Cavaillé, J. Y. *Macromolecules* 1995, 28, 6365-6367.
10. Rånby, B. G. *Discuss. Faraday Soc.* 1951, 11, 158-164.
11. Marchessault, R. H.; Morehead, F. F.; Walter, N. M. *Nature* 1959, 184, 632-633.
12. Revol, J.-F.; Bradford, H.; Giasson, J.; Marchessault, R. H.; Gray, D. G. *Int. J. Biol. Macromol.* 1992, 14, 170-172.
13. Dong, X. M.; Kimura, T.; Revol, J.-F.; Gray, D. G. *Langmuir* 1996, 12, 2076-2082.
14. Dong, X. M.; Revol, J.-F.; Gray, D. G. *Cellulose* 1998, 5, 19-32.
15. Araki, J.; Wada, M.; Kuga, S.; Okano, T. *Colloids Surf, A* 1998, 142, 75-82.
16. Onsager, L. *Ann. N.Y. Acad. Sci.* 1949, 51, 627-659.
17. Hermans, J. *J. Polym. Sci., Part C: Polym. Symp.* 1963, 2, 129-144.
18. Beck, S. C. *Phase Separation Phenomena in Cellulose Nanocrystal Suspensions Containing Dextran-Dye Derivatives*. Ph.D. Thesis, McGill University: Montréal, 2007.
19. de Gennes, P. G. *The Physics of Liquid Crystals*. Oxford: Clarendon Press, 1974.
20. Revol, J.-F.; Godbout, L.; Gray, D. G. *J. Pulp Pap. Sci.* 1998, 24, 146-149.
21. de Vries, Hl. *Acta. Cryst.* 1951, 4, 219-226.
22. Roman, M.; Gray, D. G. *Langmuir* 2005, 21, 5555-5561.
23. Edgar, C. D.; Gray, D. G. *Cellulose* 2001, 8, 5-12.
24. Bondeson, D.; Mathew, A.; Oksman, K. *Cellulose* 2006, 13, 171-180.
25. Nishiyama, Y.; Kuga, S.; Wada, M.; Okano, T. *Macromolecules* 1997, 30, 6395-6397.

26. Cranston, E. D.; Gray, D. G. *Biomacromolecules* 2006, 7, 2522-2530.
27. Wågberg, L.; Decher, G.; Norgren, M.; Lindström, T.; Ankerfors, M.; Axnäs, K. *Langmuir* 2008, 24, 784-795.
28. Revol, J.-F.; Marchessault, R. H. *Int. J. Biol. Macromol.* 1993, 15, 329-335.
29. Revol, J.-F.; Godbout, L.; Gray, D. G. 1997. Solidified liquid crystals of cellulose with optically variable properties, U.S. Pat. No. 5,629,055; May 13, to Paprican.
30. Dong, X. M.; Gray, D. G. *Langmuir* 1997, 13, 2404-2409.

The invention claimed is:

1. A method of controlling wavelength of iridescence in a solid nanocrystalline cellulose film comprising:
    subjecting an aqueous suspension of nanocrystalline cellulose (NCC) having a chiral nematic order associated with a first wavelength band of iridescence to a mechanical energy input to achieve a different chiral nematic order associated with a second wavelength band of iridescence, and thereafter allowing water of the suspension to evaporate to form the film having said second wavelength band of iridescence, said second wavelength band being located at longer wavelengths than said first wavelength band.

2. A method according to claim 1, wherein said water in said suspension is evaporated at temperatures ranging from ambient to just below boiling.

3. A method according to claim 1, wherein said water in said suspension is evaporated from a thin film of the suspension.

4. A method according to claim 2, wherein said water in said suspension is evaporated from said suspension while said suspension is in a quiescent state.

5. A method according to claim 1, wherein said mechanical energy input is ultrasound.

6. A method according to claim 1, wherein said mechanical energy input is shear forces.

7. A method according to claim 1, including exposing the aqueous NCC suspension to a predetermined condition of pH or ionic strength to shorten the wavelengths of the second wavelength band of iridescence achieved in the film.

8. A method according to claim 1, wherein said aqueous suspension has a concentration of NCC of 1% to 8%, by weight of the suspension.

9. A method according to claim 1, wherein said energy input is 50 to 25,000 joules/g of total NCC in the suspension to shift the iridescence wavelength band from said first wavelength band to said second wavelength band.

10. A method according to claim 1, wherein said film is formed as a self-supporting film.

11. A method according to claim 1, wherein said film is formed as a coating on a substrate to provide a film-coated article.

12. A method of producing a solid nanocrystalline cellulose film of predetermined iridescence comprising:
    subjecting an aqueous suspension of nanocrystalline cellulose (NCC) having a chiral nematic order associated with a first wavelength band of iridescence to a mechanical energy input to shift the chiral nematic order to one associated with a second wavelength band of iridescence, and thereafter, allowing water in the suspension to evaporate with formation of the solid film having said second wavelength band of iridescence, said second wavelength band being located at longer wavelengths than said first wavelength band.

13. A method according to claim 12, wherein said water in said suspension is evaporated at temperatures ranging from ambient to just below boiling.

14. A method according to claim 12, wherein said water in said suspension is evaporated from a thin film of the suspension.

15. A method according to claim 13, wherein said water in said suspension is evaporated from said suspension while said suspension is in a quiescent state.

16. A method according to claim 12, wherein said mechanical energy input is ultrasound.

17. A method according to claim 12, wherein said mechanical energy input is shear forces.

18. A method according to claim 12, wherein said aqueous suspension has a concentration of NCC of 1% to 8%, by weight of the suspension.

19. A method according to claim 12, wherein said energy input is 50 to 25,000 joules/g of total NCC in the suspension, to shift the iridescence wavelength band from said first wavelength band to said second wavelength band.

20. A method according to claim 12, wherein said film is formed as a self-supporting film.

21. A method according to claim 12, wherein said film is formed as a coating on a substrate to provide a film-coated article.

22. A method of producing a solid nanocrystalline cellulose film of predetermined iridescence comprising:
    subjecting a first aqueous suspension of nanocrystalline cellulose (NCC) having a chiral nematic order associated with a first wavelength band of iridescence to a mechanical energy input to achieve a different chiral nematic order associated with a second wavelength band of iridescence, and subjecting a second aqueous suspension of NCC to a mechanical energy input to achieve a second different chiral nematic order associated with a third wavelength band of iridescence; then mixing said first and second suspensions to
produce a third aqueous suspension of NCC with another chiral nematic order associated with a fourth wavelength band of iridescence intermediate said first third and second wavelength bands; and allowing water in said third suspension to evaporate with formation of the solid film having said fourth wavelength band of iridescence, said fourth wavelength band being located at a longer wavelength than said first wavelength band.

* * * * *